US009931950B2

(12) United States Patent
Demure et al.

(10) Patent No.: US 9,931,950 B2
(45) Date of Patent: Apr. 3, 2018

(54) METHOD FOR RECOVERING ELECTRICAL ENERGY WITH VOLTAGE SMOOTHING ON AN ONBOARD ELECTRICAL NETWORK

(71) Applicant: RENAULT s.a.s, Boulogne-Billancourt (FR)

(72) Inventors: Sophie Demure, Antony (FR); Gerard Saint-Leger, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 328 days.

(21) Appl. No.: 14/434,454

(22) PCT Filed: Oct. 10, 2013

(86) PCT No.: PCT/FR2013/052418
§ 371 (c)(1),
(2) Date: Apr. 9, 2015

(87) PCT Pub. No.: WO2014/057223
PCT Pub. Date: Apr. 17, 2014

(65) Prior Publication Data

US 2015/0274025 A1 Oct. 1, 2015

(30) Foreign Application Priority Data

Oct. 10, 2012 (FR) ..................................... 12 59637

(51) Int. Cl.
*B60L 11/18* (2006.01)
*B60L 1/00* (2006.01)
(Continued)

(52) U.S. Cl.
CPC ........... *B60L 11/1811* (2013.01); *B60L 1/003* (2013.01); *B60L 1/02* (2013.01); *B60L 1/14* (2013.01);
(Continued)

(58) Field of Classification Search
None
See application file for complete search history.

(56) References Cited

U.S. PATENT DOCUMENTS 6,622,804 B2 * 9/2003 Schmitz ................ B60W 20/13 180/65.245
8,145,407 B2 * 3/2012 Ueno ................. B60L 15/2045 123/399
(Continued)

FOREIGN PATENT DOCUMENTS

DE 10 2011 054 582 4/2012
EP 2 412 559 2/2012
(Continued)

OTHER PUBLICATIONS

French Search Report dated Jul. 26, 2013 in French Patent Application No. 1259637 Filed Oct. 10, 2012.
(Continued)

*Primary Examiner* — Thomas J Hiltunen
(74) *Attorney, Agent, or Firm* — Oblon, McClelland, Maier & Neustadt, L.L.P.

(57) ABSTRACT

During a method for recovering electrical energy, for example during a deceleration phase of a motor vehicle including at least one electric accumulator battery, a low alternator voltage is applied during a first type of vehicle driving phase, and a high alternator voltage higher than the low alternator voltage is applied for a second type of vehicle driving phase. The transition from the low alternator voltage to the high alternator voltage is carried out by applying a first voltage step of a predefined amplitude, followed by a knee in the voltage curve, the voltage curve then continuing into at least a second voltage ramp phase of which the average slope is strictly lower than the voltage ramp of the first step.

13 Claims, 3 Drawing Sheets

(51) Int. Cl.

| | |
|---|---|
| ***B60L 1/02*** | (2006.01) |
| ***B60L 1/14*** | (2006.01) |
| ***B60L 7/18*** | (2006.01) |
| ***B60L 11/14*** | (2006.01) |
| ***B60L 15/20*** | (2006.01) |

(52) U.S. Cl.

CPC ................. *B60L 7/18* (2013.01); *B60L 11/14* (2013.01); *B60L 11/1861* (2013.01); *B60L 15/2009* (2013.01); *B60L 2240/427* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y02T 10/92* (2013.01)

(56) References Cited

U.S. PATENT DOCUMENTS

| | | | | |
|---|---|---|---|---|
| 8,531,053 | B2 * | 9/2013 | Choi | B60K 6/48 180/65.265 |
| 8,862,365 | B2 * | 10/2014 | Ubukata | B60R 16/03 123/179.3 |
| 9,068,546 | B2 * | 6/2015 | Gibson | F02N 11/006 |
| 9,099,948 | B2 * | 8/2015 | Clark | H02J 7/1446 |
| 9,455,657 | B2 * | 9/2016 | Ito | H02J 7/16 |
| 2002/0109407 | A1 * | 8/2002 | Morimoto | B60K 6/28 307/10.1 |
| 2006/0060399 | A1 | 3/2006 | Tabata et al. | |
| 2007/0241723 | A1 * | 10/2007 | Billat | H02J 7/1446 322/28 |
| 2011/0001352 | A1 * | 1/2011 | Tamura | B60R 16/033 307/9.1 |
| 2012/0029766 | A1 | 2/2012 | Niwa | |
| 2014/0361611 | A1 * | 12/2014 | Saint-Leger | B60L 1/003 307/10.1 |
| 2016/0167636 | A1 * | 6/2016 | Kim | B60W 10/30 701/36 |
| 2016/0251057 | A1 * | 9/2016 | Stegmaier | B62M 6/45 |

FOREIGN PATENT DOCUMENTS

| | | |
|---|---|---|
| JP | 2006-280161 A | 10/2006 |
| JP | 2009 126395 | 6/2009 |
| JP | 2009-165263 A | 7/2009 |

OTHER PUBLICATIONS

International Search Report dated Dec. 6, 2013 in PCT/FR2013/052418 Filed Oct. 10, 2013.

* cited by examiner

Valt_high
Valt_low
$V_{max}$
$D_{up}$
$D_{down}$
$V_{p1}$
$V_{p3}$
$dV_{up}$
$dV_{up}$
$\Delta V_{up}$
$\Delta V_{down}$
$dV_{down}$
$dV_{down}$
$\Delta t_{up}$
$dt_{up}$
$dt_{up}$
$\Delta t_{down}$
$dt_{down}$
$dt_{down}$
$t_a$
$t_b$
Time in s
1
2
3
4
5
6
22
25
26
27
28
38
$\alpha$
$\alpha'$
$\beta$
$\gamma$

METHOD FOR RECOVERING ELECTRICAL ENERGY WITH VOLTAGE SMOOTHING ON AN ONBOARD ELECTRICAL NETWORK

BACKGROUND

The invention relates to electrical supply systems of motor vehicles powered by a heat engine or by hybrid thermal-electrical propulsion, and notably to electrical supply systems comprising an electrical alternator or an electric machine able to function as an alternator and to deliver electrical energy.

In the case of a vehicle with heat or hybrid propulsion, it can be required to increase the voltage delivered by the alternator during the regenerative braking phases of the vehicle, for example, and to reduce this voltage when the vehicle begins again to use the energy of a heat engine in order to proceed. The voltage excursions of the alternator can have repercussions on the behavior of the electrical consumers of the vehicle whose variations of brightness, rhythm, air flow rate, etc. can be perceived as being erratic by the occupants of the vehicle.

The patent applications FR2934429 and WO200984381 propose regulations as a function of the state of charge of a lead battery and of the intensity of the current. The control strategies described generate sudden variations of voltage in the onboard network.

BRIEF SUMMARY

The purpose of the invention is to propose an electrical supply system for a vehicle, comprising a variable voltage controlled alternator, this system making it possible not only to limit the average fuel consumption of the vehicle but also allowing the occupants of the vehicle to benefit from a stable environment, notably a visual, thermal, acoustic and air environment, that is to say one that is barely or not disturbed by the voltage variations of the alternator.

For this purpose, the invention proposes a method for recovering electrical energy, notably during a phase of deceleration of a motor vehicle equipped with at least one electric accumulator battery, in which a low alternator voltage regulated at a constant value is imposed during a first type of vehicle driving phase, and a high alternator voltage regulated at a constant value, higher than the low alternator voltage, is imposed during a second type of vehicle driving phase. The transition from the low alternator voltage to the high alternator voltage is carried out by imposing a first voltage step of predefined amplitude, followed by a change of slope in the voltage curve, said voltage curve delivered by the alternator as a function of time then continuing into at least a second voltage rise phase of which the average slope is strictly lower than the slope of the voltage rise of the first step.

According to a preferred embodiment, the upward voltage increment is at least five times less than the first voltage rise amplitude. The upward voltage increment can for example be between 0.05 V and 0.3 V, for example it can be close to 0.1 V. The first voltage rise amplitude can be between 0.5 V and 1.5 V and preferably between 0.75 V and 1.25 V, for example it can be close to 1 V. The difference between the low alternator voltage and the high alternator voltage can for example be between 0.5 and 3 V.

The term "alternator" refers to any electric machine able to convert mechanical energy into electrical energy. "Voltage increase" in this case means an increase in absolute value. "Voltage step" means a first substantially linear voltage increase, with an upward voltage slope substantially corresponding to the maximum voltage slope that the alternator is capable of delivering, followed by a change of slope and a level of voltage, or a change of slope and a growth phase having a more moderate slope. It is considered that if the alternator can be controlled at variable voltage values that are all strictly negative, a method of controlling this alternator is equivalent to controlling variable voltages that are all strictly positive by reversing the signs, the term "high voltage" then being understood as in absolute value.

According to an advantageous implementation, the voltage is maintained constant during a first predefined time interval, after the change of slope.

It is then possible, for example, to continue increasing the voltage delivered by the alternator by a succession of second voltage steps, each one substantially being one and the same upward voltage increment, strictly less than the amplitude of the first voltage step.

In a preferred embodiment, substantially one and the same second time interval is imposed between the starts of two second voltage steps.

The second time interval can for example be between 0.2 s and 1 s, for example between 0.25 s and 0.35 s. According to a variant embodiment, the time interval separating the start of the first voltage step and the start of the second voltage step can be equal to the second time interval. According to another variant embodiment, the time interval separating the start of the first voltage step and the start of the second voltage step can be greater than the second time intervals. According to yet another variant embodiment, the second time interval can be variable as a function of the variation of the state of charge of the battery.

Advantageously, the voltage delivered by the alternator continues to be increased until one of the following two conditions is met: the voltage of the alternator reaches the high alternator voltage, or the vehicle is no longer in the second type of driving phase.

Once the high alternator voltage is reached, the alternator voltage is preferably maintained at this high alternator voltage until one of the following conditions is met: a characteristic value of the state of charge of the battery reaches a recharge threshold value, or the vehicle is no longer in the second type of driving phase.

When a characteristic value of the state of charge of the battery reaches a recharge threshold value, or when the vehicle is no longer in the second type of driving phase, and the alternator voltage is higher than a predefined end of charge voltage, it is possible to impose a reduction of the voltage delivered by the alternator, from the maximum voltage reached by the alternator to the end of charge voltage, by firstly imposing a third voltage step having a predefined downward voltage amplitude, if the difference between the maximum voltage reached and the end of charge voltage is strictly greater in absolute value than the downward voltage amplitude.

The end of charge voltage can be a function of the driving conditions and of the history of the driving conditions of the vehicle. If the difference between the maximum voltage reached and the end of charge voltage is less than or equal in absolute value to the third voltage amplitude, it is possible to impose a voltage step descending directly from the maximum voltage reached to the end of charge voltage.

Advantageously, after the third downward voltage step, the reducing of the voltage is then continued toward the end of charge voltage with a decrease slope that is strictly less on average than the slope of the third voltage step.

It is for example possible to impose, after the third voltage step, a succession of fourth voltage steps, each representing substantially one and the same downward voltage increment strictly less than the downward amplitude of the third voltage step, and separated from each other by one and the same downward time increment.

According to a preferred embodiment, the downward voltage increment is at least five times smaller than the downward amplitude of the third voltage step. The downward voltage increment can for example be between 0.05 V and 0.3 V, for example it can be close to 0.1 V. The downward amplitude of the third voltage step can be between 0.5 V and 1.5 V, and preferably between 0.75 V and 1.25 V, for example it can be close to 1 V. The downward amplitude of the third voltage step can be of fixed value, independent from the prior history of the alternator voltage. It can for example be substantially equal to the first voltage rise amplitude. According to another variant embodiment, the downward voltage amplitude can be a function of, for example it can be proportional to, the difference between the maximum voltage reached and the end of charge voltage.

The downward time interval can for example be between 0.2 s and 1 s, for example it can be between 0.25 s and 0.35 s.

The invention also proposes an electrical energy supply system for a vehicle, the system comprising:

- a network comprising at least one electrical consumer device,
- an electric accumulator battery connected to the network,
- a controllable alternator connected to the network and capable of delivering electrical energy to the network at a reference voltage that can be controlled at least a low alternator voltage regulated at a strictly positive constant value and at a high alternator voltage regulated at a constant value strictly higher than the low alternator voltage.

The system comprises an electronic control unit connected to the alternator and to the battery and configured to impose on the alternator, during predetermined driving conditions of the vehicle, an increase in the voltage delivered by the alternator, from a low alternator voltage to a high alternator voltage. The electronic control unit is configured to impose a first voltage step of predefined amplitude, followed by a change of slope of the voltage curve delivered by the alternator as a function of time and followed by a voltage increasing curve having an average slope strictly less than the upward voltage slope of the first step.

BRIEF DESCRIPTION OF THE DRAWINGS

Other purposes, features and advantages of the invention will become apparent on reading the following description, given solely by way of example that is in no way limiting and with reference to the appended drawings in which.

DETAILED DESCRIPTION

Figure 1:
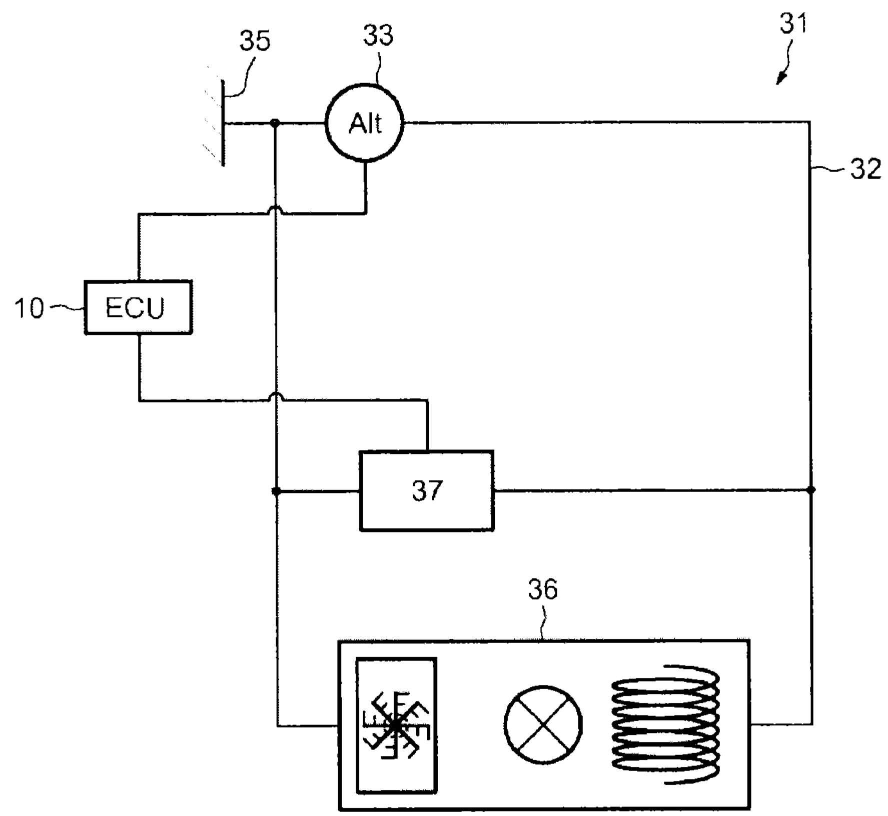
FIG. 1 is a block diagram of a power supply system according to the invention.

As shown in FIG. 1, an electrical power supply system 31 of a motor vehicle comprises an electrical network 32, an alternator 33, a battery 37, for example a battery of the lithium-ion type or an assembly of energy storages (Lithium+Lead, Lead+Supercapacitor, etc.), and an electronic control unit 10. The alternator 33 is able to convert mechanical energy taken from a shaft connected to a heat engine (not shown) into electrical energy sent on the electrical network 32.

In the electrical network 32 are disposed electrical consumers 36, such as for example an air conditioning device, lighting means and heating means. The electrical consumers 36 are connected in parallel onto the network 32. The network 32 comprises a grounding 35 on the chassis of the vehicle. The network 32 also powers a starter able to crank the heat engine of the vehicle in order to initiate the first combustion cycle.

The electronic control unit 10 is connected to the alternator 33, to which it is able to impose a variable reference voltage and notably to which it is able to impose two separate reference values, a first non-zero value referenced Valt_low and a second value referenced Valt_high, strictly higher in absolute value than the first value. It is possible for example to choose a voltage sign convention such that Valt_low is strictly positive and that Valt_high is strictly higher than Valt_low.

The term "terminals" of each of the elements, refers to the two points of connection of that element to the network 32.

Figure 2:
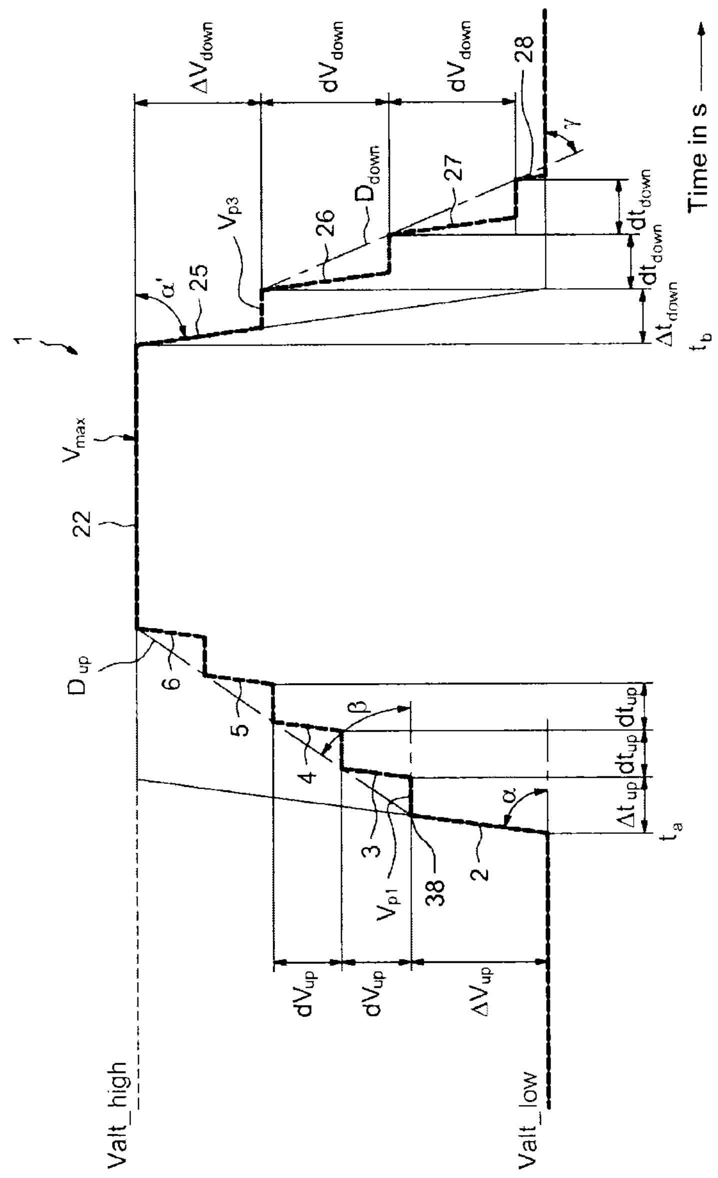
FIG. 2 is a simplified graph of the variations with respect to time of the voltage delivered by the alternator of the power supply system shown in FIG. 1, during a particular driving phase of a vehicle comprising the power supply system shown in FIG. 1.

FIG. 2 shows an example of a voltage curve delivered by the alternator 33 shown in FIG. 1 during the time interval including a regenerative braking phase of the vehicle on which the alternator is installed. The time interval corresponding to a regenerative braking phase can for example be identified by the electronic control unit 10 by an engine injection cut-off signal starting at the time $t_a$ and ending at a time $t_b$.

In the example shown in FIG. 2, before the engine injection cut-off, the alternator 33 delivers current at the low alternator voltage Valt_low. The electronic control unit 10 is configured so that, if the engine injection cut-off lasts for a sufficiently long time, the alternator voltage reference is taken to the high alternator voltage value Valt_high, higher than the initial off-load voltage of the battery.

Typically, the low alternator voltage can be chosen in such a way as to define a minimum off-load voltage acceptable for the battery 37 or for another battery connected to the network, and the high alternator voltage can be chosen in such a way as to authorize an additional recharging of the battery 37 during specific driving phases, for example regenerative braking phases. The increase in the voltage delivered by the alternator will allow the battery 37 to receive a recharging current from the alternator 33. If the off-load voltage of the battery was initially higher than the low alternator voltage Valt_low, the direction of current arriving at the battery 37 will reverse, the battery no longer contributing to supplying the network but contributing to absorbing a portion of the current delivered by the alternator 33.

However, even if the battery 37 absorbs a portion of the current delivered by the alternator 33, the increase in the alternator voltage can create a voltage increase on the network 32 which can become perceptible at the level of the various consumers 36, for example by an extra brightness of the internal lighting lamps of the vehicle, by an acceleration of the rhythm of the windscreen wipers, by an increase in the airflow rate blown inside the passenger compartment, etc.

In order to prevent such variations from being able to disturb the occupants of the vehicle, the transition from the low alternator voltage to the high alternator voltage is carried out as follows by the electronic control unit. The electronic control unit 10 initiates a first upward voltage step 2 of predefined amplitude $\Delta V_{up}$, then it maintains the voltage of the alternator constant during a time interval $\Delta t_{up}$, thus imposing on it a first voltage plateau $V_{p1}$.

The first voltage rise amplitude $\Delta V_{up}$, is chosen so as not to cause a perceptible change at the level of the various electrical consumers "noticed" by the occupants of the vehicle. During the voltage plateau $V_{p1}$, the current entering the battery 37 has the time to stabilize and the battery 37 is again able to receive a possible additional current caused by a new voltage increase. The electronic control unit 10 then controls the voltage reference of the alternator 33 in such a way as to cause a second voltage step 3 of amplitude $dV_{up}$, less than the amplitude $\Delta V_{up}$ of the first voltage step. It then again maintains the voltage of the alternator constant during a predefined time interval $dt_{up}$. The amplitudes $\Delta V_{up}$, and $dV_{up}$, of the first and second voltage steps can for example be predefined on the basis of prior tests on the vehicle, these tests making it possible to know the amplitudes that can be imposed without perceptibly disturbing the behavior of the electrical consumers 36.

The time interval $\Delta t_{up}$, separating the start of the first voltage step and the start of the second voltage step 3 and the time interval $dt_{up}$ separating the start of the second voltage step from the start of a third voltage step 4 can also be determined during prior tests. They can be of the same order of magnitude, or they can be different. The time interval $dt_{up}$ can be shortened if the upward voltage increment $dV_{up}$ is very small. The electronic control unit 10 then continues to increase the reference voltage of the alternator 33 by carrying out other second steps of amplitude substantially equal to that of the second step 3, the second steps being indicated by the references 4, 5, 6 in FIG. 2. If the duration of the injection cut-off is sufficient, the electronic control unit thus brings the voltage of the alternator 33 to a maximum voltage $V_{max}$ which is equal to the high alternator voltage Valt_high.

If the duration of the injection cut-off does not make it possible to thus reach the high alternator voltage, the electronic control unit stops the voltage increase of the alternator at the value $V_{max}$ corresponding to the last plateau reached when the engine injection cut-off stops. The choice of amplitude $\Delta V_{up}$ of the first voltage step makes it possible to quickly reach a first voltage which, as a function of the level of charge of the battery 37, can make it possible to recharge the battery 37 if its off-load voltage is less than or equal to the voltage of the first level $V_{p1}$. The occupants of the vehicle do not perceive the voltage increase since the behavior of the electrical consumers remains unchanged. As the battery 37 adapts to the current delivered to it, the increase of the alternator voltage by the second voltage plateaus makes it possible to attain the high alternator voltage with the maximum speed of voltage increase that does not disturb the behavior of the consumers.

Once the high alternator voltage is reached, the electronic control unit maintains the alternator voltage constant until the end of the engine injection cut-off at the time $t_b$. Similar to during the rise, the electronic control unit 10 then imposes a downward voltage step 25 or third voltage step, of third downward amplitude $\Delta V_{down}$, this step being followed by a voltage plateau at a third voltage level $V_{p3}$. The third downward amplitude $\Delta V_{down}$ is chosen to be as big as possible without creating disturbances that can be felt in the behavior of the electrical consumers 36. The time interval $\Delta t_{down}$, separating the start of the third step 25 from the start of a fourth step 26 and which determines the length of the plateau following the third step 25, is chosen such that the following downward voltage step does not disturb the behavior of the consumers 36. The electronic control unit then imposes a series of fourth downward voltage steps 26, 27 having as their amplitude a downward increment $dV_{down}$, each followed by a voltage plateau, the time interval $dt_{down}$ separating the start of two successive fourth voltage steps being chosen so as to bring the alternator voltage to the low alternator voltage Valt_low reached by a last downward voltage step 28 as quickly as possible without disturbing the behavior of the consumers 36.

The electronic control unit can also be programmed to apply this type of succession of upward and then downward voltage steps, each time with a first upward step and a first downward step of predefined amplitude greater than the amplitude of the following steps in order to cause a temporary voltage increase either between the low alternator voltage and an intermediate alternator voltage, for example in order to carry out a partial recharging of the battery 37 whilst driving on a freeway, or to change from an intermediate alternator voltage already reached to the high alternator voltage if a regenerative braking phase is initiated.

In this latter case, the downward voltage phase can then comprise a first step of predefined amplitude $\Delta V_{down}$, followed by steps of smaller amplitude until the alternator voltage is brought not to the intermediate voltage of the alternator but to the low alternator voltage.

In the eventuality where the voltage rising and then descending profile is used to change from the low alternator voltage to an intermediate alternator voltage, for example during a freeway driving phase, the duration during which the electronic control unit maintains the alternator voltage at the maximum voltage reached $V_{max}$, which is then the intermediate alternator voltage, can be conditioned either by a modification of the driving conditions, for example if a regenerative braking occurs at that time, or in order to start a downward phase because the battery has reached a predefined charge level considered sufficient in order not to prolong the excess consumption caused by the rising of the alternator voltage.

The succession of second levels 3, 4, 5, 6 all having one and the same upward voltage increment and rhythms at one and the same time interval $dt_{up}$, separating the starts of two successive second steps, is a simple way of continuing to increase the alternator voltage after the latter has reached the voltage of the first plateau $V_p$, whilst allowing the battery 37 and the network 32 the time to become adapted to the subsequent voltage increases, that is to say to the voltage increases above the value $V_{p1}$. Thus, the continuation of the voltage increase is not perceptible at the level of the behavior of the consumers 36.

The series of second upward voltage steps and fourth downward voltage steps could be replaced by an upward voltage slope and by a downward voltage slope respectively.

It is thus possible to configure the electronic control unit so that it firstly brings the alternator voltage from the low alternator voltage to the first plateau voltage $V_{p1}$ with a slope of voltage increase with respect to time represented by an angle $\alpha$ and corresponding to the maximum voltage increase speed permitted by the alternator. The electronic control unit 10 can then continue to make the voltage increase with a slower rate represented for example by a voltage increase speed having an angle $\beta$ smaller than $\alpha$ in order to bring the voltage of the alternator from the first plateau voltage $V_{p1}$ to the maximum voltage to reach $V_{max}$. In both cases, the voltage curve undergoes a change of slope 38 at the end of the rise of the first voltage step.

In this case, the predefined parameters are the first voltage rise amplitude $\Delta V_{up}$, the maximum voltage to reach $V_{max}$ and the upward voltage slope β to bring the voltage of the alternator to the desired maximum voltage $V_{max}$.

A voltage plateau can be provided between the time when the alternator voltage reaches the voltage of the first level $V_{p1}$=Valt_low+$\Delta V_{up}$ and the time when the second voltage slope of slope β is applied. It can be chosen to impose the upward voltage slope β as soon as the voltage of the first level $V_{p1}$=Valt_low+$\Delta V_{up}$ is reached, without exhibiting a voltage plateau.

The series of second voltage steps is then replaced by a linear voltage progression along a straight line $D_{up}$ shown in dashed line in FIG. 2.

Similarly, the series of fourth downward voltage steps could be replaced by a substantially linear decrease (shown by a straight line $D_{down}$ in dashed line in FIG. 2), with a decrease speed represented by an angle γ of amplitude strictly less than a maximum decrease of the alternator voltage slope α', the slope α' being used for carrying out the change of the alternator voltage from the maximum value $V_{max}$ reached to the value Vmax−$\Delta V_{down}$=$V_{p3}$.

In FIG. 2, the straight line $D_{up}$ has been shown as passing through the end of the first upward voltage slope of the first step 2, with no intermediate voltage plateau. On the other hand, the downward straight line $D_{down}$ has been shown as passing through the end of a voltage plateau succeeding the first downward voltage step 25 of the alternator. Variant embodiments can be envisaged in which a voltage plateau is interposed between the end of the first slope 2 and the upward straight line $D_{up}$ and/or in which no voltage plateau is placed between the end of the first downward voltage slope 25 and the downward straight line $D_{down}$.

Figure 3:
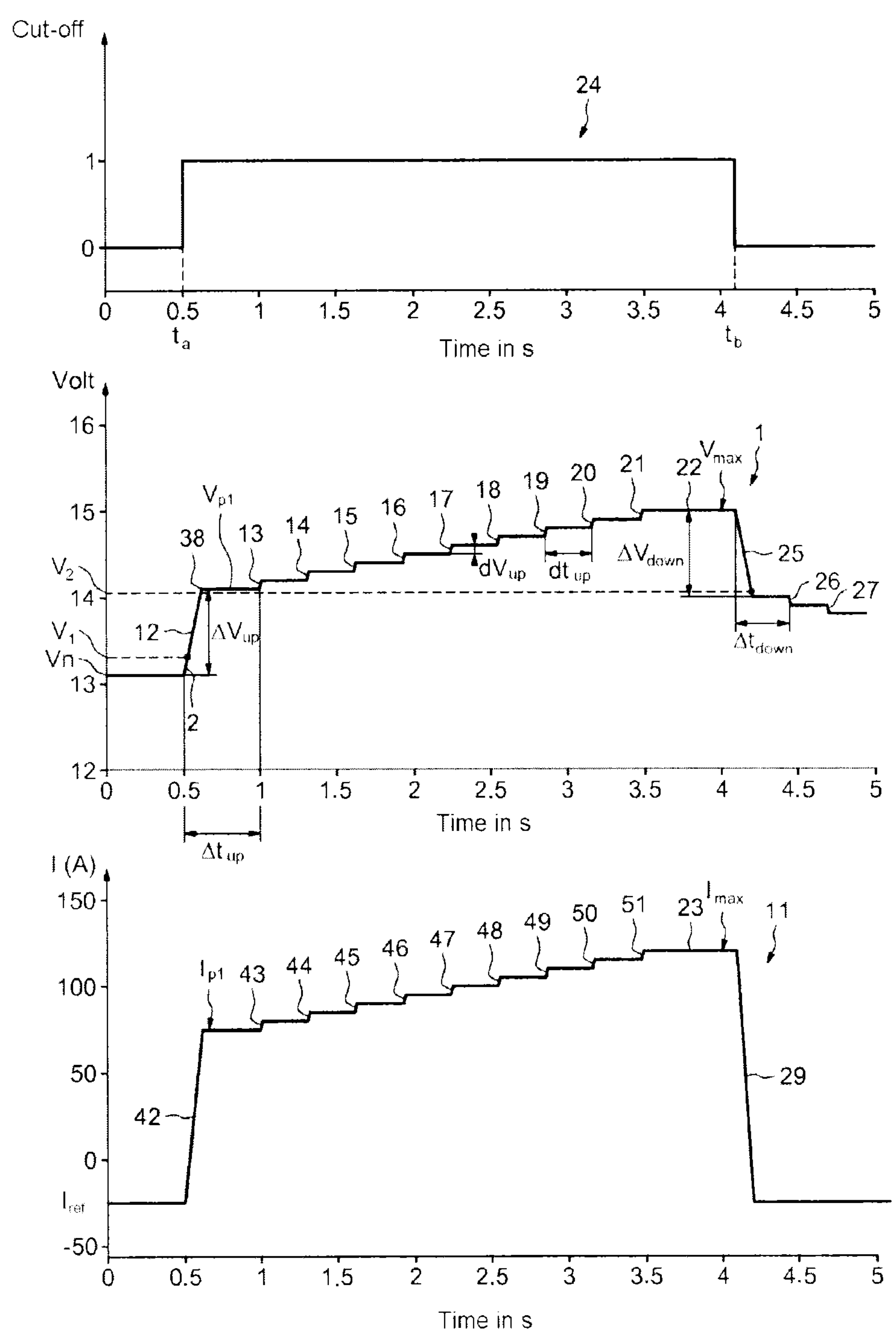
FIG. 3 is a simplified graph of the variations with respect to time of various values during another particular driving phase of the vehicle comprising the power supply system shown in FIG. 1.

FIG. 3 shows in parallel the variation of an engine injection cut-off signal by a curve 24, the variation, with respect to the same time scale, of the voltage (curve 1) of the alternator 33 and the variation, shown by a curve 11, of the current received by the battery.

The engine injection cut-off signal can be for example a Boolean function which changes from a zero value to a value equal to 1 at a first time $t_a$, corresponding to the start of a regenerative braking phase, and passing through 0 again at a time $t_b$, in this case slightly more than 4 seconds, and corresponding to the end of a regenerative braking phase.

The voltage of the alternator 33 is initially at a value $V_n$ which can correspond for example to the low alternator voltage Valt_low or which can correspond to an intermediate alternator voltage of between Valt_low and Valt_high. The off-load voltage of the battery before the regenerative braking step is represented by a value $V_1$. The off-load voltage of the battery 37 at the time $t_b$ when the injection cut-off ends is represented by a value $V_2$. When the electronic control unit 10 receives, at the time $t_a$, the signal 24 indicating to it that the injection has been cut-off, it increases (preferably at the maximum possible voltage increase speed) the voltage of the alternator, by an increment corresponding to the first voltage rise amplitude $\Delta V_{up}$. It then maintains the value of the alternator constant until a time interval $\Delta t_{up}$, starting from the beginning of the first voltage step here reference 12, elapses.

The electronic control unit then imposes a succession of second voltage steps here referenced 13, 14, 15, 16, 17, 18, 19, 20, 21 corresponding to one and the same upward voltage increment $dV_{up}$ and separated by one and the same time interval $dt_{up}$. When the voltage of the alternator reaches a voltage $V_{max}$, which can for example correspond to the high alternator voltage, the electronic control unit maintains the voltage constant until the signal 24 indicates to it at the time $t_b$ that the engine injection has started again. If the end of the injection cut-off occurs before the voltage of the alternator reaches the value Valt_high or reaches the provided intermediate alternator voltage, the voltage decrease scenario is initiated in a similar manner starting from the maximum voltage $V_{max}$ reached.

It then carries out the voltage descent according to the scenario already described in FIG. 2. It happens that, during the first upward voltage step 12, the voltage of the alternator here passes above the off-load voltage $V_1$ which characterized the battery before the regenerative braking stage. At the time when the voltage passes through this value $V_1$, the current curve 11 of the battery changes sign. With the convention of FIG. 3, before the regenerative braking stage, the battery current is negative to reflect the fact that the battery supplies the network 32, then when the voltage of the alternator passes though the voltage $V_1$, the battery current becomes positive by a current increase 42, because the battery receives a recharging input current.

The first voltage plateau at the voltage $V_{p1}$ results in a current plateau with an intensity $I_{p1}$. The second voltage steps 13, 14, . . . 21 cause second current steps 43, 44, . . . 49, 50, 51. The voltage plateau 22 at the maximum voltage reached $V_{max}$ causes a current plateau 23 at a maximum voltage reached $I_{max}$. When the voltage of the alternator again falls below the voltage $V_{max}$ to the voltage $V_{max}$−$\Delta V_{down}$ corresponding to the third (downward) voltage step, the voltage of the alternator drops below the off-load voltage $V_2$ of the battery, causing a new reversal of the battery 37 current which again starts to flow into the network 32.

The straight portion 29 toward the end of the curve 11 shows this rapid change from the maximum charging current of the battery $I_{max}$ to a negative battery current corresponding to the consumption of the network 32.

The subject of the invention is not limited to the described examples of embodiment and it can be subjected to numerous variations, with regard to the arrangement of the various elements of the system 31 and to the values of the high alternator voltage, the low alternator voltage, the intermediate alternator voltage, to the conditions in which it is chosen to apply the intermediate alternator voltage or in which it is chosen to switch over to the high alternator voltage. The upward profile with a first step bigger than the following ones can be applied during the transition from the low alternator voltage to an intermediate alternator voltage ($V_{max}$) lower than the high alternator voltage and imposed for example at the time of freeway driving, or during the transition from such an intermediate alternator voltage to a high alternator voltage corresponding to the maximum voltage imposed on the alternator during regenerative braking phases for example. It can of course be applied to a transition from the low alternator voltage to the high alternator voltage. Similarly, the downward voltage profile according to the invention, with a first voltage step bigger than the following ones, can be applied to a transition from the high alternator voltage to the low alternator voltage, to a transition from the high alternator voltage to an intermediate alternator voltage, or to a transition from an intermediate alternator voltage to a low alternator voltage. The time durations separating the starts of each upward step can be identical, variable in an increasing or decreasing manner according to a predefined pattern, or variable as a function of recharging parameters of the battery, for example as a function of the recharging current of the battery. The time interval separating the start of the first voltage step from the start of the second voltage step can be identical, or it can be different, or it can be part of a duration progression pattern, the same as that of the time intervals separating the following voltage steps. Similarly, the time intervals separating two voltage steps during the voltage decrease phase can be equal, or can follow similar rules, or can follow progression rules different from the rules defining the intervals separating the upward voltage steps. The amplitudes of the second voltage steps can all be equal, or they can follow a predefined regular progression, provided that they remain of amplitude substantially less than the amplitude of the first voltage step (for example at least five times less than the amplitude of the first voltage step).

The incremental growth and then reduction profile of voltage according to the invention can be applied to different power supply systems installed in a vehicle whenever frequent voltage variations of the onboard electrical network are required between two non-zero voltages.

The invention can be used for a power supply system for a vehicle propelled by a heat engine. It can also be used for an electrical power supply system of a vehicle with hybrid thermal-electrical propulsion. It can be used for defining the voltage profile delivered by an electrical machine able to function as a generator on a vehicle propelled by a heat engine, one with hybrid thermal-electrical propulsion or one with electric propulsion only.

The system according to the invention makes it possible to reduce the overall consumption of fuel of the vehicle, to prolong the service life of the battery and to ensure a stable and comfortable environment in the passenger compartment, despite the voltage variations imposed on the alternator.

The invention claimed is:

1. A method for recovering electrical energy during a phase of deceleration of a motor vehicle including at least one electric accumulator battery, comprising:

imposing a low alternator voltage regulated at a constant value during a first type of vehicle driving phase;

imposing a high alternator voltage regulated at a constant value, higher than the low alternator voltage, during a second type of vehicle driving phase;

wherein a transition from the low alternator voltage to the high alternator voltage is carried out by imposing a first voltage step of predefined amplitude, followed by a change of slope in the voltage curve, the voltage curve delivered by the alternator as a function of time then continuing into at least a second voltage rise phase of which the average slope is strictly lower than the slope of the voltage rise of the first step.

2. The method as claimed in claim 1, wherein the voltage is maintained constant at a first voltage level during a first predefined time interval, after the change of slope.

3. The method as claimed in claim 2, wherein, after the first level, the voltage delivered by the alternator continues to be increased by a succession of second voltage steps, each one substantially being one and a same upward voltage increment, strictly less than the amplitude of the first voltage step.

4. The method as claimed in claim 3, wherein one and a same second time interval is imposed between starts of two second voltage steps.

5. The method as claimed in claim 1, wherein the voltage delivered by the alternator continues to be increased until one of the following two conditions is met: the voltage of the alternator reaches the high alternator voltage, or the vehicle is no longer in the second type of driving phase.

6. The method as claimed in claim 5, wherein once the high alternator voltage is reached, the alternator voltage is maintained at this high alternator voltage until one of the following conditions is met: a characteristic value of the state of charge of the battery reaches a recharge threshold value, or the vehicle is no longer in the second type of driving phase.

7. The method as claimed in claim 1, wherein, when a characteristic value of the state of charge of the battery reaches a recharge threshold value, or when the vehicle is no longer in the second type of driving phase, and the alternator voltage is higher than a predefined end of charge voltage, a reduction of the voltage delivered by the alternator is imposed, from a maximum voltage reached by the alternator to an end of charge voltage, by firstly imposing a third downward voltage step having a predefined downward voltage amplitude, if the difference between the maximum voltage reached and the end of charge voltage is strictly greater in absolute value than the downward voltage amplitude.

8. The method as claimed in claim 7, wherein reducing of the voltage is then continued toward the end of charge voltage with a decrease slope that is strictly less on average than the slope of the third voltage step.

9. The method as claimed in claim 7, wherein, after the third voltage step, a succession of fourth voltage steps, each representing substantially one and a same downward voltage increment strictly less than the downward amplitude of the third voltage step, and separated from each other by one and the same downward time increment, is imposed.

10. An electrical energy supply system for a vehicle, the system comprising:

a network comprising at least one electrical consumer device;

an electric accumulator battery connected to the network;

a controllable alternator connected to the network and configured to deliver electrical energy to the network at a reference voltage that can be controlled at least a low alternator voltage regulated at a strictly positive constant value and at a high alternator voltage regulated at a constant value strictly higher than the low alternator voltage;

an electronic control unit connected to the alternator and to the battery and configured to impose on the alternator, during predetermined driving conditions of the vehicle, an increase in the voltage delivered by the alternator, from a low alternator voltage to a high alternator voltage, the electronic control unit being configured to impose a first voltage step of predefined amplitude, followed by a change of slope of the voltage curve delivered by the alternator as a function of time and followed by a voltage increasing curve having an average slope strictly less than the upward voltage slope of the first step.

11. A method for recovering electrical energy during a phase of deceleration of a motor vehicle including at least one electric accumulator battery, comprising:

imposing a low alternator voltage regulated at a constant value during a first type of vehicle driving phase;

imposing a high alternator voltage regulated at a constant value, higher than the low alternator voltage, during a second type of vehicle driving phase;

wherein a transition from the low alternator voltage to the high alternator voltage is carried out by imposing a first voltage step of predefined amplitude, followed by a change of slope in the voltage curve, the voltage curve delivered by the alternator as a function of time then continuing into at least a second voltage rise phase of which the average slope is strictly lower than the slope of the voltage rise of the first step, and wherein, when a characteristic value of the state of charge of the battery reaches a recharge threshold value, or when the vehicle is no longer in the second type of driving phase, and the alternator voltage is higher than a predefined end of charge voltage, a reduction of the voltage delivered by the alternator is imposed, from a maximum voltage reached by the alternator to an end of charge voltage, by firstly imposing a third downward voltage step having a predefined downward voltage amplitude, if the difference between the maximum voltage reached and the end of charge voltage is strictly greater in absolute value than the downward voltage amplitude.

12. The method as claimed in claim 11, wherein reducing of the voltage is then continued toward the end of charge voltage with a decrease slope that is strictly less on average than the slope of the third voltage step.

13. The method as claimed in claim 11, wherein, after the third voltage step, a succession of fourth voltage steps, each representing substantially one and a same downward voltage increment strictly less than the downward amplitude of the third voltage step, and separated from each other by one and the same downward time increment, is imposed.

* * * * *